United States Patent
Chung et al.

(10) Patent No.: US 8,332,591 B2
(45) Date of Patent: Dec. 11, 2012

(54) CACHE MEMORY UNIT WITH EARLY WRITE-BACK CAPABILITY AND METHOD OF EARLY WRITE BACK FOR CACHE MEMORY UNIT

(75) Inventors: Young Jin Chung, Seongnam-si (KR); Kil Whan Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 386 days.

(21) Appl. No.: 12/334,822

(22) Filed: Dec. 15, 2008

(65) Prior Publication Data

US 2009/0157954 A1     Jun. 18, 2009

(30) Foreign Application Priority Data

Dec. 14, 2007   (KR) .......................... 10-2007-0130741

(51) Int. Cl.
*G06F 12/00*     (2006.01)
(52) U.S. Cl. .............. 711/143; 711/E12.04; 711/E12.07
(58) Field of Classification Search .................... 711/143
See application file for complete search history.

(56) References Cited

U.S. PATENT DOCUMENTS

| | | | |
|---|---|---|---|
| 6,427,184 B1 * | 7/2002 | Kaneko et al. | 711/4 |
| 6,446,145 B1 * | 9/2002 | Har et al. | 710/68 |
| 2003/0120837 A1 * | 6/2003 | Ippolito et al. | 710/33 |
| 2005/0044311 A1 * | 2/2005 | Lahiri et al. | 711/113 |
| 2006/0064546 A1 * | 3/2006 | Arita et al. | 711/130 |

OTHER PUBLICATIONS

Lee et al. Eager Writeback—a technique for Improving Bandwidth Utilization. Proceedings of the 33rd annual ACM/IEEE international symposium on Microarchitecture [online], [retrieved on Feb. 8, 2011]. Retrieved from the Internet <URL:http://ieeexplore.ieee.org/stamp/stamp.jsp?tp=&arnumber=898054>.*

* cited by examiner

*Primary Examiner* — Hashem Farrokh
*Assistant Examiner* — Larry Mackall
(74) *Attorney, Agent, or Firm* — Volentine & Whitt, PLLC (57) ABSTRACT

A cache memory unit includes: a cache memory; an early write-back condition checking unit for checking whether an early write-back condition has been satisfied; and an early write-back execution unit for monitoring a memory bus connecting the cache memory unit and an external memory unit, and in response to the memory bus being idle and the early write-back condition being satisfied, for causing dirty data in the cache memory to be written back to the external memory unit using the memory bus.

23 Claims, 7 Drawing Sheets

CACHE MEMORY UNIT WITH EARLY WRITE-BACK CAPABILITY AND METHOD OF EARLY WRITE BACK FOR CACHE MEMORY UNIT

PRIORITY STATEMENT

This application claims priority under 35 U.S.C. §119 from Korean Patent Application 2007-0130741, filed on 14 Dec. 2007 in the name of Kil Whan Lee et al., the entirety of which is hereby incorporated by reference for all purposes as if fully set forth herein.

SUMMARY

1. Field

This invention pertains to the field of memory systems and in particular, to memory systems that include a write back cache.

2. Description

Processors and memory systems often employ a cache memory as a temporary storage area where frequently accessed data can be stored for rapid access. Once the data is stored in the cache memory, future use can be made by accessing the cached copy rather than re-fetching or recomputing the original data, so that the average access time is shorter. Thus, a primary use of a cache memory is to increase the speed of data between a central processing unit (CPU) and main memory.

Figure 1:
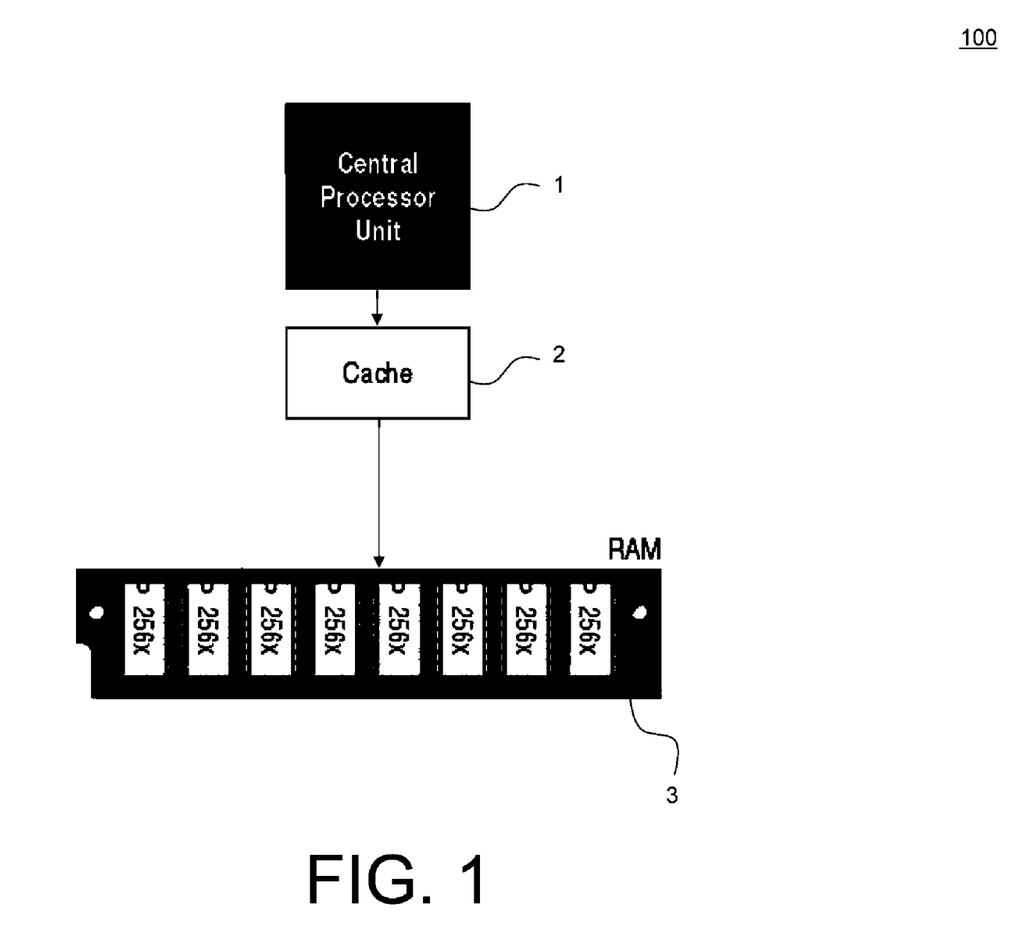
FIG. 1 shows a processing system including a cache memory.
Figure 2:
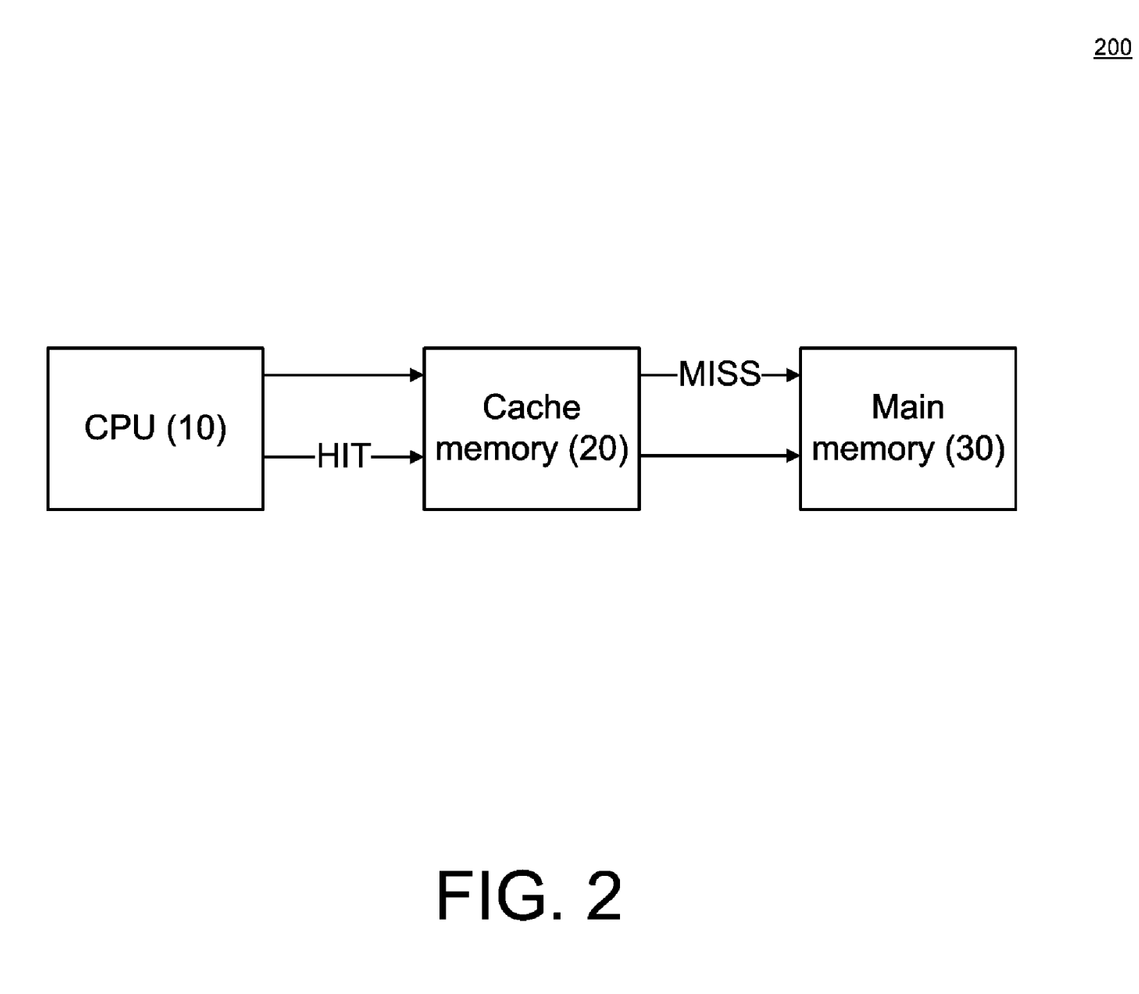
FIG. 2 shows one embodiment of a data processing system including a cache memory.

FIG. 2 illustrates a processing system 200 that includes a central processing unit (CPU) 10, a cache memory 20 and a main memory (e.g., random access memory (RAM)) 30. Memory operations of processing system 200 with cache memory 20 will now be described.

When CPU 10 needs to read data (or an instruction) of main memory 30, it accesses cache memory 20 using an index and a tag and determines whether there is a "hit" or a "miss." If there is a "hit" then cache memory 20 returns the requested data to CPU 10. On the other hand, if there is a "miss," then a cache block in cache memory 20 must be selected to be replaced, and the requested data is then accessed from main memory 30. In that case, operations of CPU 10 may possibly be stalled until the requested data can be fetched to cache memory 20 and then returned to CPU 10. It should be noted that in the case of a cache miss, the entire missed cache line is loaded into cache memory 20.

In the case of a memory write or store operation, CPU 10 writes the data to cache memory 20, and them cache memory 20 transfers the data to main memory 30 Cache memory 20 stores data in memory blocks (e.g., 32 bytes). However, when writing data to cache memory 20, CPU 10 may only be writing one line (8 bytes) of that memory block. So to write a particular line of data from CPU 10 to cache memory 20, if cache memory 20 does not already store the memory block that includes the particular line of interest, then cache memory 20 must first retrieve the memory block from main memory 30, then overwrite the line of interest, and then store the block back to main memory 30. If a memory block in cache memory 20 includes a line that has been overwritten by CPU 10, then it is called a "dirty" block. At any time, in general cache memory 20 may include "clean" blocks and dirty blocks.

In general, processing system 100 may employ one of two different kinds of policies for transferring data from cache memory 2 to main memory 3: a write-through cache policy or a write-back cache policy.

If processing system 100 employs a write-through cache policy, after CPU 1 writes the data to cache memory 2, cache memory 2 immediately to main memory 3. In some cases, this may result in a wait state while data is being written to main memory 3, causing operations of CPU 1 to pause until the wait is over.

If processing system 100 employs a write-back cache policy, then cache memory 2 stores the data for a period of time and then sends it to main memory 3 later. In any kind of cache miss, if the line to be replaced in the cache memory 2 is dirty, then it is written back to main memory 3.

Write-back caches are much more powerful than write-through caches, because with a write-back cache the CPU 1 does not have to stop for a wait state of the main memory 3. However, write-through caches are less expensive easier to implement than write-back caches, Two common parameters that affect the performance of processing system 1 are the hit ratio and the cache miss penalty. The hit ratio is defined as the percentage of time that the data that is sought is found in the cache memory. The cache miss penalty is defined as the time required to move data from a level of memory that is further away from the CPU, to a level that is closer to the CPU, and then to the CPU itself.

However, there are some limitations in existing processing systems that employ cache memory.

Cache memory temporarily stores a partial set of the data of the main memory. Therefore, there is not enough space in cache memory for all data. Cache memory can easily overflow and the processing system can be stalled for such a period while data is being retrieved from the main memory to the cache memory, or returned from the cache memory to the main memory.

Furthermore, if new data should be stored in the cache memory, then it is necessary that old existing data should be kicked out of the cache memory. In this case, the old data is written to the main memory. This write-back operation requires lots of system clock-cycles, resulting in a cache miss penalty. Cache miss penalty is one of the primary elements that affect the system performance. Cache miss penalty is sometimes very large. However, it is difficult in existing systems to reduce the cache miss penalty.

In one aspect of the inventive concept, a cache memory unit comprises: a cache memory; an early write-back condition checking unit for checking whether an early write-back condition has been satisfied; and an early write-back execution unit for monitoring a memory bus connecting the cache memory unit and an external memory unit, and in response to the memory bus being idle and the early write-back condition being satisfied, for causing dirty data in the cache memory to be written back to the external memory unit using the memory bus.

In another aspect of the inventive concept, a write buffer for a data processing system comprises: a buffer memory; an early write-back condition checking unit for checking whether an early write-back condition has been satisfied; and an early write-back execution unit for monitoring a memory bus connecting the write buffer and an external memory unit, and in response to the memory bus being idle and the early write-back condition being satisfied, for causing dirty data in the buffer memory to be written back to the external memory unit using the memory bus.

In yet another aspect of the inventive concept, a method is provided of operating a memory device connected via a memory bus with an external memory unit. The method comprises: (a) determining whether an early write-back condition is satisfied; (b) determining whether a data block is dirty; (c)

determining whether the memory bus is idle; and (d) when the early write-back condition is satisfied, and the data block is dirty, then writing the dirty data block back from the memory device to the external memory unit when the memory bus is idle.

In still another aspect of the inventive concept, a processing system comprises: a processor; a main memory unit; a cache memory unit; and a memory bus connecting the cache memory unit and the main memory unit, wherein the cache memory unit comprises: a cache memory; an early write-back condition checking unit for checking whether an early write-back condition has been satisfied; and an early write-back execution unit for monitoring the memory bus, and in response to the memory bus being idle and the early write-back condition being satisfied, for causing dirty data in the cache memory to be written back to the main memory unit using the memory bus.

In a further aspect of the invention, a method is provided of operating a processing system comprising a processor, a main memory unit, a memory device, and a memory bus connecting the memory device and the main memory unit. The method comprises: (a) providing data and a write address from the processor to the cache memory unit; (b) determining whether an early write-back condition is satisfied; (c) determining whether a data block corresponding to the write address is dirty; (d) determining whether the memory bus is idle; and (e) when the early write-back condition is satisfied, and the data block is dirty, then writing the dirty data block back from the memory device to the external memory unit when the memory bus is idle.

DETAILED DESCRIPTION OF THE EMBODIMENTS

FIG. 2 illustrates a data processing system 200 that includes a central processing unit (CPU) 10, a cache memory unit 20 and a main memory unit 30. For example, data processing system 200 may be included in a personal computer (PC), a mobile device, a personal; digital assistant (PDA), etc. In one embodiment, data processing system 200 may execute multimedia operations using 3D graphics. Meanwhile, main memory unit 30 may include static random access memory (SRAM), dynamic RAM (DRAM), flash memory, a hard disk drive (HDD), a floppy disk drive (FDD), a CD-ROM, etc. In one embodiment, data processing system 200 may include two or more hierarchical levels of cache memory, in which case main memory unit 30 may include another cache memory.

Figure 3:
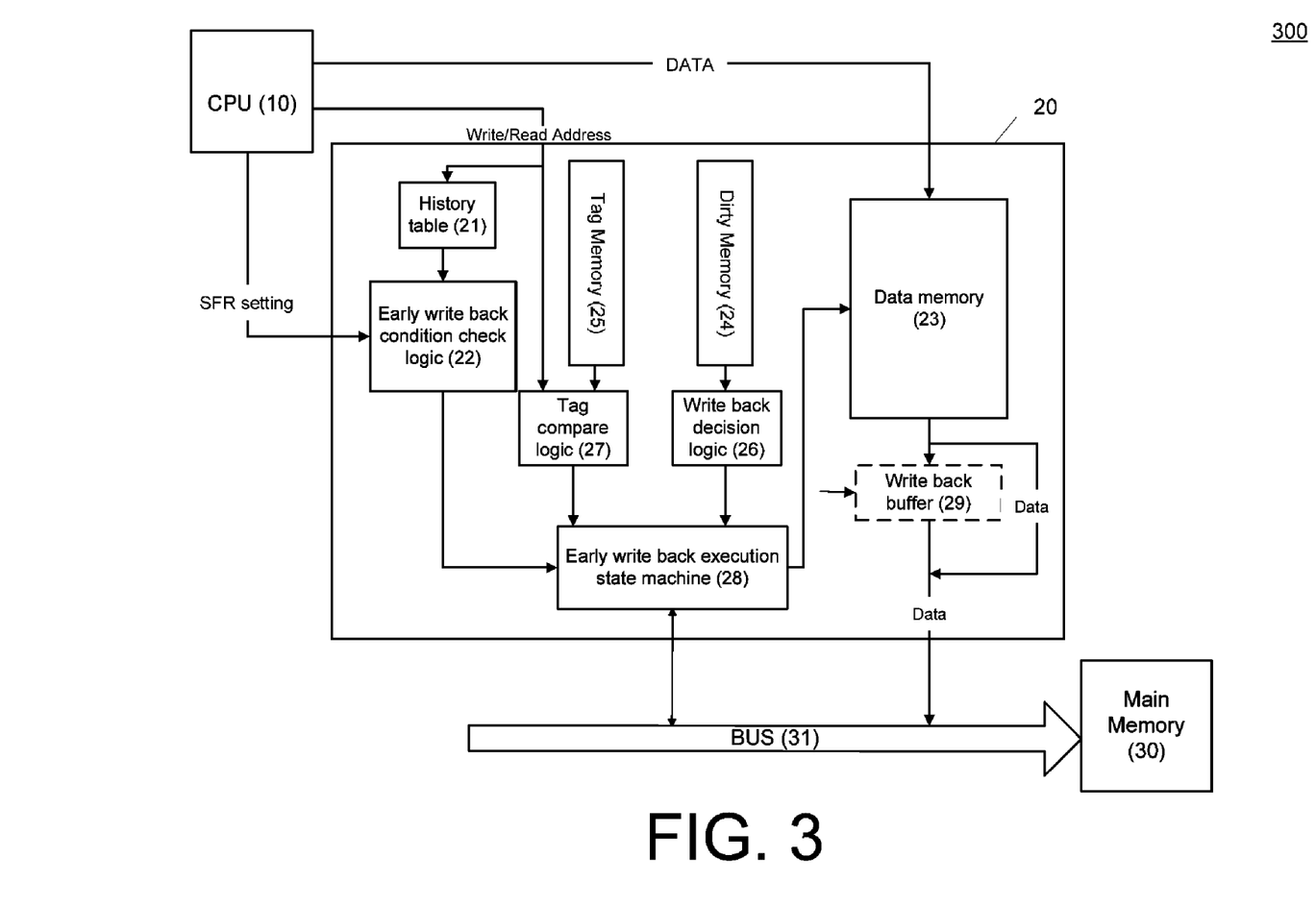
FIG. 3 shows one embodiment of a cache memory unit in a data processing system.

FIG. 3 shows one embodiment of a data processing system 300 including CPU 10, cache memory unit 20, and an external main memory unit 30. Cache memory unit 20 includes a history table 21, early write-back condition checking unit 22, cache (data) memory 23, dirty memory 24, tag memory 25, write-back decision logic 26, tag compare logic 27, early write back execution unit 28, and a write-back buffer 29. In data processing system 300, bus 31 connects cache memory unit 20 and the external main memory unit 30.

History table 21 stores therein a history of write operations to cache memory unit 20.

In one embodiment, early write-back execution unit 28 comprises a state machine.

In operation, CPU 10 issues DATA, write/read address, and information for setting a special function register (SFR).

In one embodiment, SFR information includes a write policy (i.e., write-back or write-through), a replace policy (e.g., LRU (Least Recently Used), LFU (Least Frequently Used) or FIFO (First-In, First-Out)) and a number M of write back blocks of data to be written back to external main memory unit 30. In one optional arrangement, SFR information also includes an early write-back setting.

Early write-back condition checking unit 22 enables early write-back cache operation in accordance with information from history table 21 and SFR information provided to cache memory unit 20. In one embodiment, early write-back condition checking unit 22 determines that the early write-back condition has been satisfied when write addresses received by the cache memory unit sequentially increase N times consecutively, where N>2, and in one embodiment, where N is in a range from 8 to 16. Early write-back condition checking unit 22 generates a signal for early write back execution unit 28 indicating that early write-back is enabled or turned on. Then, when the state of bus 31 is idle, early write back execution unit 28 operates data memory 23 and write back buffer 29. Early write-back execution unit 28 monitors memory bus 31 connecting cache memory unit 20 and external memory unit 30, and in response to the memory bus 31 being idle and the early write-back condition being satisfied, causes dirty data in cache memory unit 20 to be written back to the external memory unit 30 using the memory bus 31.

Figure 4:
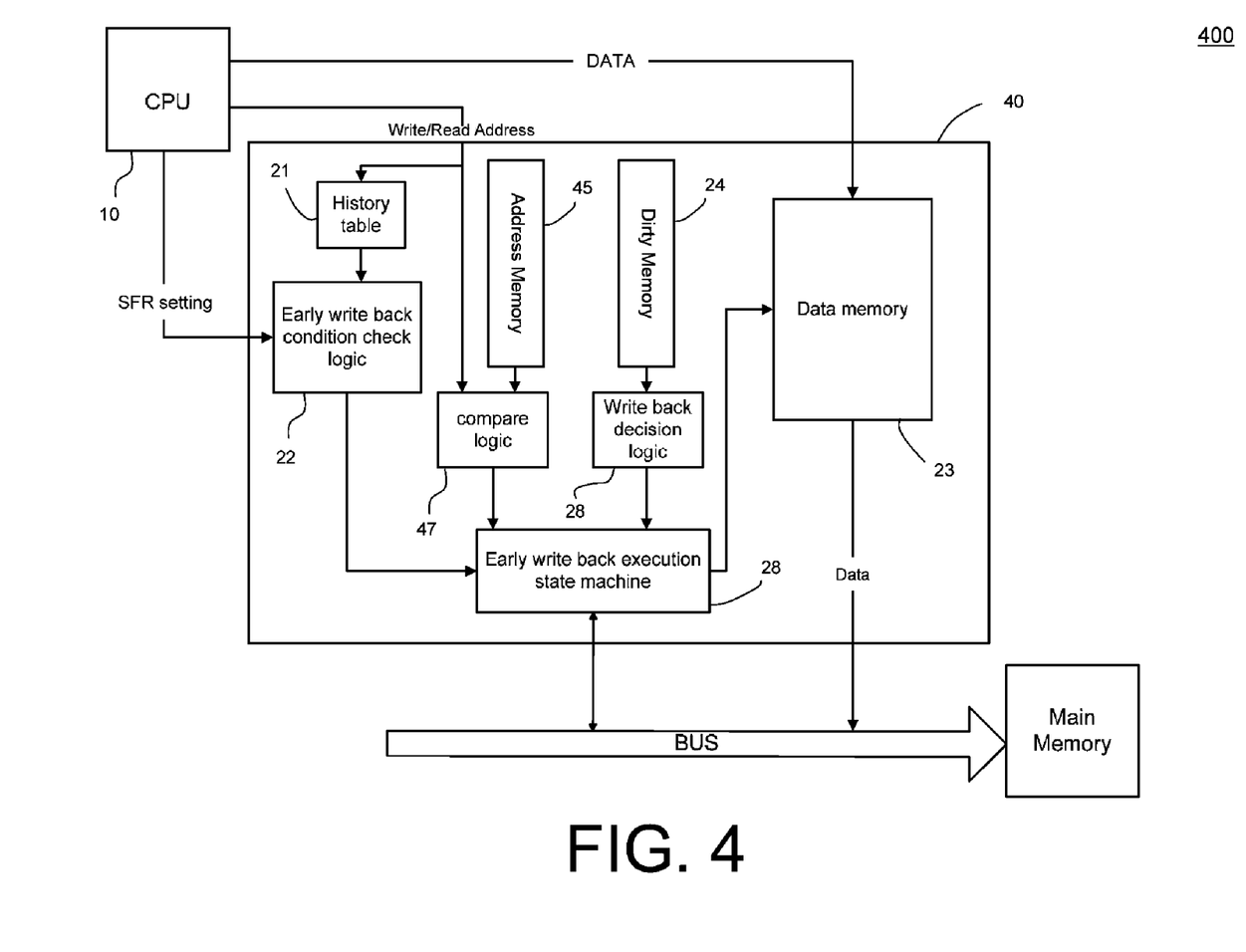
FIG. 4 shows one embodiment of a write buffer in a data processing system.

FIG. 4 shows one embodiment of a data processing system 400 including a write buffer 40. Write buffer 40 is similar to cache memory unit 20, with the following differences. First, cache memory unit 20 can do read/write operations but write buffer 40 can only do write operations. Second, in write memory 40, an address memory 45 is substituted for tag memory 25 in cache memory unit 20. Third, in write memory 40, compare logic 47 is substituted for tag compare logic 27 in cache memory unit 20. Fourth, write buffer 40 doesn't include write back buffer 29.

In write buffer 40, early write-back condition checking unit 22 determines whether the early write-back condition has been satisfied in response to information provided from history table 21 to early write-back condition checking unit 22, and further in response to SFR information provided to write buffer 40. In one embodiment, early write-back condition checking unit 22 determines that the early write-back condition has been satisfied when write addresses received by write buffer 40 sequentially increase N times consecutively, where N>2, and in one embodiment, where N is in a range from 8 to 16.

Figure 5:
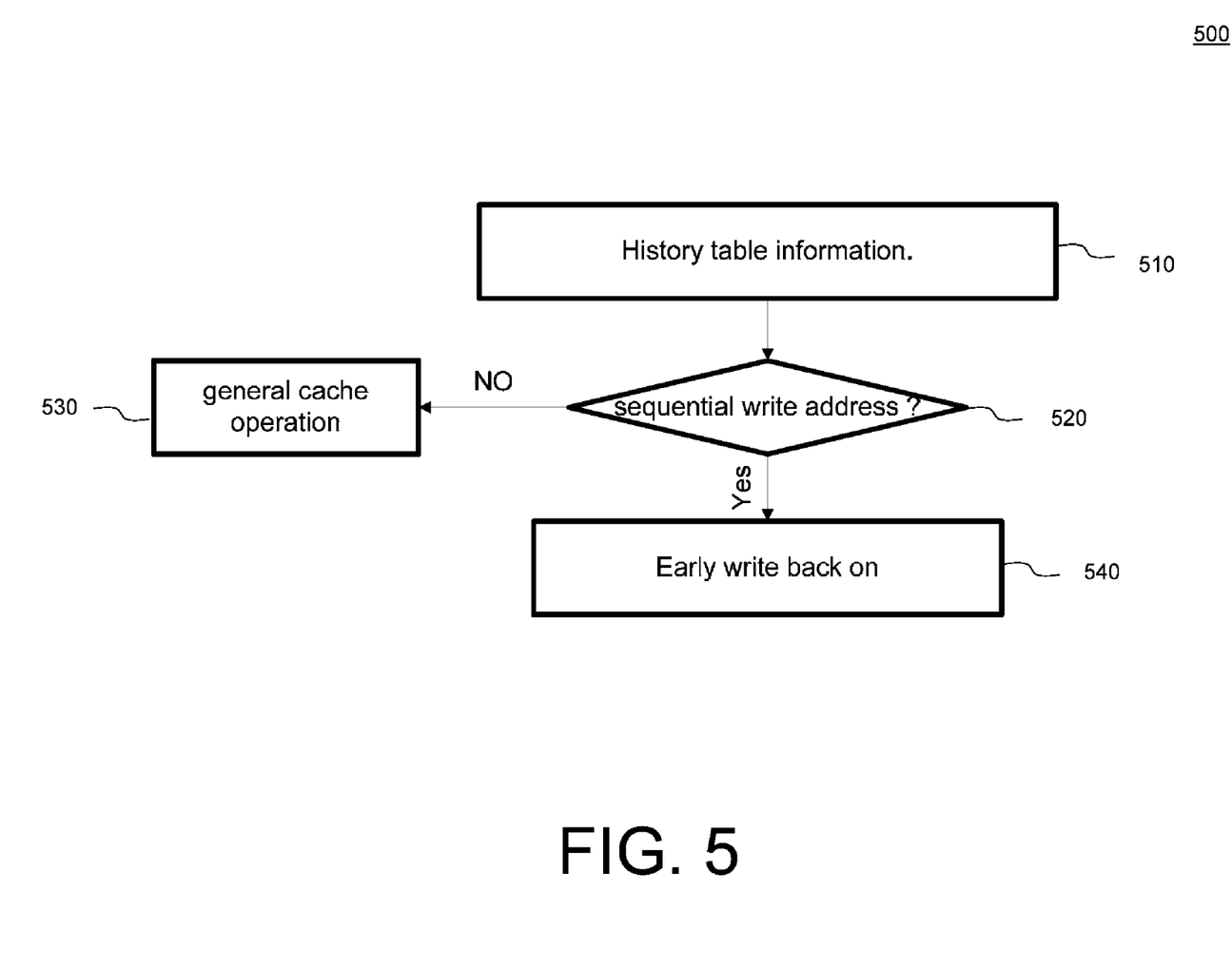
FIG. 5 is a flowchart illustrating one embodiment of an operation of early write-back condition checking unit.

FIG. 5 is a flowchart illustrating one embodiment of an operation 500 of early write-back condition checking unit 22. In step 510, early write-back condition checking unit 22 accesses information from history table 21. In step 520, early write-back condition checking unit 22 determines whether there have been N sequential write addresses. In one embodiment, N>2, and in another embodiment, N>8, and in a further embodiment, N>16. If not, then in a step 530 a normal cache operation is carried out. If so, then in a step 540, and early write-back condition is satisfied, and early write-back condition checking unit 22 enables an early write-back operation by early write-back execution unit 28.

Figure 6:
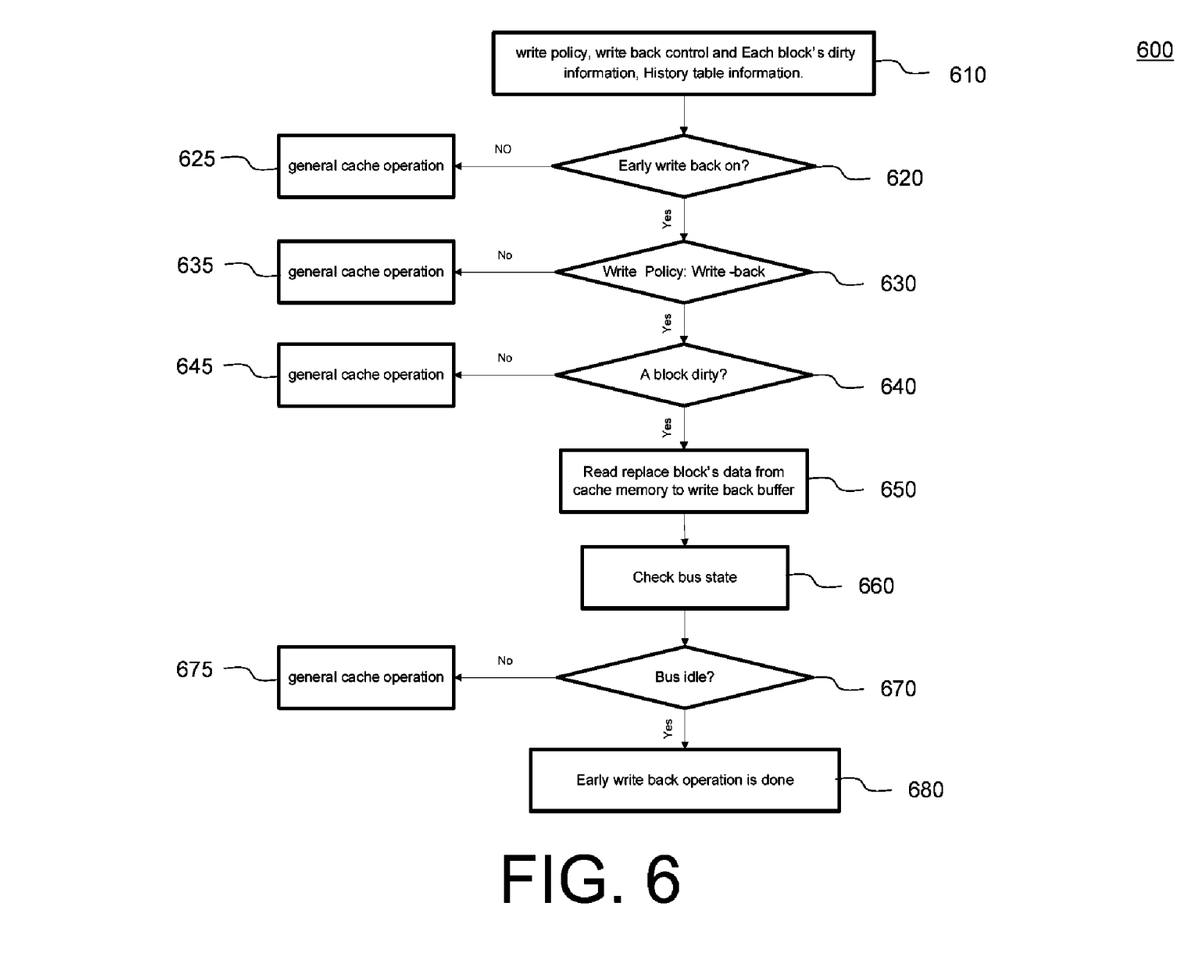
FIG. 6 is a flowchart illustrating one embodiment of an operation of early write-back execution unit.

FIG. 6 is a flowchart illustrating one embodiment of an operation 600 of early write-back execution unit 28.

At the outset, in step 610, a cache memory unit receives SFR information (e.g., a write policy, a replace policy), write/read address, and data from CPU 10. Also, early write back execution state machine 28 receives dirty block information from write back decision logic 26, and a bus state of bus 31 from a bus controller (not shown in FIG. 3).

In step 620 it determines whether early write-back has been enabled or turned on, for example by early write-back condition checking unit 22. If not, then in a step 625 a normal cache operation is carried out.

On the other hand, if early write-back is enabled, then in a step 630 the write policy is checked to determine if a write-back policy is selected. If not, then in a step 635 a normal cache operation is carried out.

On the other hand, if the write-back policy is selected, then in a step 640 it is determined whether a memory block is dirty. If not, then in a step 645 a normal cache operation is carried out.

On the other hand, if the block is dirty, then in a step 650 it is determined to replace the block's data from cache memory unit 20 to external main memory unit 30.

Then, in a step 660, the state of bus 31 is checked.

Next, in a step 670 it is determined if bus 31 is idle. If not, then in a step 675 a normal cache operation is carried out.

On the other hand, if bus 31 is idle, then in a step 680, an early write-back operation is performed. In that case, dirty data is written back to the main memory unit 30 in advance, when bus 31 and main memory 30 are idle.

The process described above can be repeated for M dirty memory blocks where M is a number of dirty data blocks of data to be written back to main memory unit 30. In one embodiment, M may be specified in SFR information received by cache memory unit 20 from CPU 10.

By this process, the cache miss penalty of the cache memory system is reduced because dirty blocks are already written back to main memory unit 30 when a subsequent cache miss occurs.

Figure 7A:
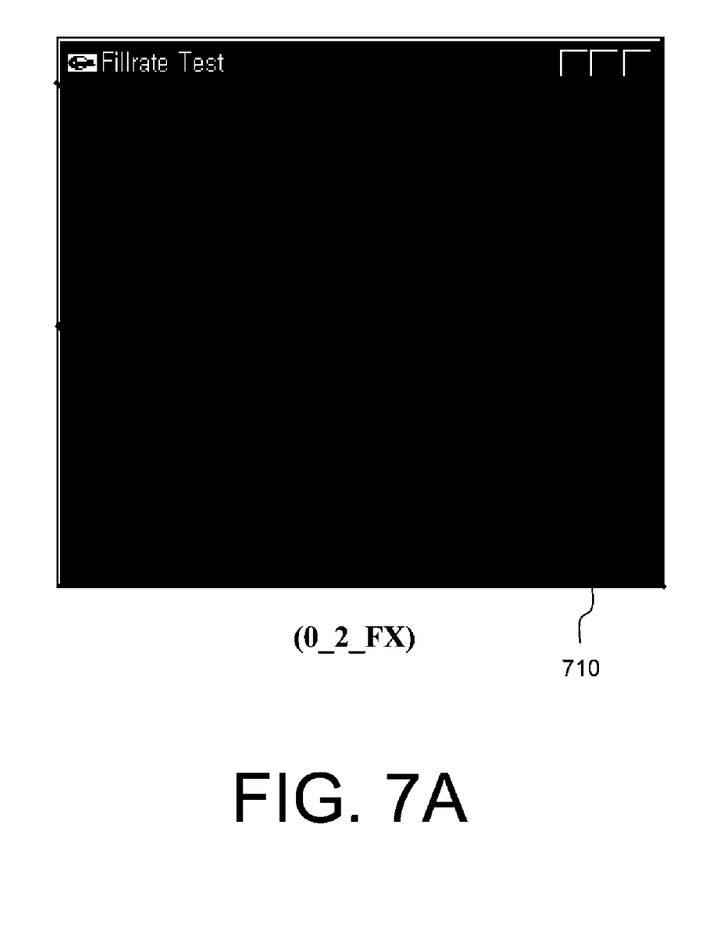
FIG. 7A shows a test scene used for evaluating the performance of 3D graphics accelerator employing a write-back cache.

FIG. 7A shows a test scene 710 used for evaluating the performance of 3D graphics accelerator employing a write-back cache.

Figure 7B:
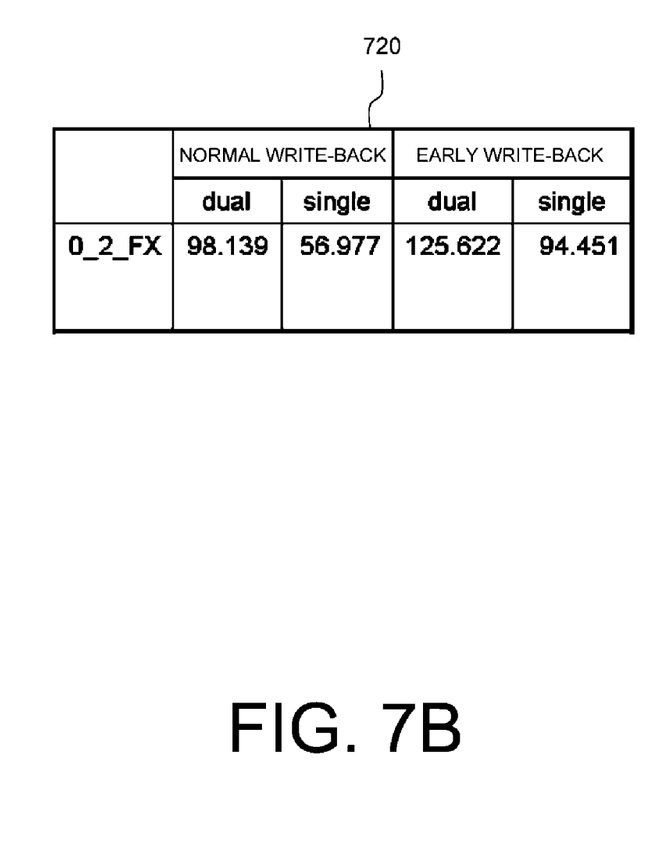
FIG. 7B is a table comparing the speed of a 3D graphic accelerator rendering the test scene of FIG. 7A when employing an exemplary conventional write-back cache memory as a color cache, versus employing an exemplary write-back cache memory with early write-back.

FIG. 7B shows a table 720 comparing the speed of a 3D graphic accelerator rendering the test scene of FIG. 7A when employing an exemplary conventional write-back cache memory as a color cache, versus employing an exemplary write-back cache memory with early write-back. In the example of FIGS. 7A-B, the image resolution is 320×240, and the clock frequency is 100 MHz. As seen in FIG. 7B, in the case of a single pipeline, with an exemplary normal write-back cache the data processing speed is 56.977 megapixels/second In contrast, with an exemplary cache memory unit with early write-back the data processing speed is 94.451 megapixels/second. Meanwhile, in the case of a dual pipeline, with an exemplary normal write-back cache the data processing speed is 98.139 megapixels/second. In contrast, with an exemplary cache memory unit with early write-back the data processing speed is 125.622 megapixels/second. So it can be seen in this example that the data processing speed is improved by employing a cache memory system with early write-back.

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A cache memory unit, comprising:
a cache memory;
a history table for storing therein a history of write operations to the cache memory unit;
an early write-back condition checking unit for checking whether an early write-back condition has been satisfied, wherein the early write-back condition checking unit determines that the early write-back condition has been satisfied in response to information received from the history table indicating that write addresses received by the cache memory unit have sequentially increased N times consecutively, where N>2, and wherein the early write-back condition checking unit determines that the early write-back condition has not been satisfied in response to information received from the history table indicating that the write addresses received by the cache memory unit have not sequentially increased N times consecutively; and
an early write-back execution unit for monitoring a memory bus connecting the cache memory unit and an external memory unit, and in response to the memory bus being idle and the early write-back condition being satisfied, for causing dirty data in the cache memory to be written back to the external memory unit using the memory bus,
wherein the early write-back condition checking unit determines whether the early write-back condition has been satisfied further in response to special function register information provided to the cache memory unit, and wherein the special function register information indicates a number of blocks of data to be written back to the external memory unit.

2. The cache memory unit of claim 1, wherein the special function register information further indicates a policy to be used to select which dirty data in the cache memory to write back to the external memory unit.

3. The cache memory unit of claim 1, further comprising a write back buffer, wherein the write back buffer writes the dirty data in the cache memory back to the external memory unit.

4. The cache memory unit of claim 1, further comprising a write back buffer, wherein the cache memory unit bypasses the write back buffer when writing the dirty data back to the external memory device.

5. The cache memory unit of claim 1, wherein N>8.

6. The cache memory unit of claim 1, wherein N>16.

7. A write buffer for a data processing system, comprising:
a buffer memory;
a history table for storing therein a history of write operations to the write buffer;
an early write-back condition checking unit for checking whether an early write-back condition has been satisfied, wherein the early write-back condition checking unit determines that the early write-back condition has been satisfied in response to information received from the history table indicating that write addresses received by the write buffer have sequentially increased N times consecutively, where N>2, and wherein the early write-back condition checking unit determines that the early write-back condition has not been satisfied in response to information received from the history table indicating that the write addresses received by the write buffer have not sequentially increased N times consecutively; and an early write-back execution unit for monitoring a memory bus connecting the write buffer and an external memory unit, and in response to the memory bus being idle and the early write-back condition being satisfied, for causing dirty data in the buffer memory to be written back to the external memory unit using the memory bus, wherein the early write-back condition checking unit determines whether the early write-back condition has been satisfied further in response to special function register information provided to the write buffer, and wherein the special function register information indicates a number of blocks of data to be written back to the external memory unit.

8. The write buffer of claim 7, wherein the special function register information further indicates a policy to be used to select which dirty data in the buffer memory to write back to the external memory unit.

9. The write buffer of claim 7, wherein N>8.

10. The write buffer of claim 9, wherein N>16.

11. A method of operating a memory device connected via a memory bus with an external memory unit, the method comprising:
(a) storing in a history table of the memory device a history of write operations to the memory device;
(b) determining that an early write-back condition is satisfied in response to the stored history of write operations to the memory device indicating that write addresses received by the memory device have sequentially increased N times consecutively, where N>2, and wherein the early write-back condition is determined not satisfied in response to the stored history of write operations to the memory device indicating that the write addresses received by the memory device have not sequentially increased N times consecutively;
(c) determining whether a data block in the memory device is dirty;
(d) determining whether the memory bus is idle; and
(e) when the early write-back condition is satisfied, and the data block is dirty, then writing the dirty data block back from the memory device to the external memory unit when the memory bus is idle,
wherein determining an early-write back condition is satisfied further comprises reading special function register information provided to the memory device, and wherein the special function register information indicates a number of blocks of data to be written back to the external memory unit.

12. The method of claim 11, wherein determining whether an early write-back condition is satisfied comprises determining whether an early-write back mode is enabled in the memory device.

13. The method of claim 11, further comprising repeating steps (c)-(e) for M dirty data blocks, where M is included in special function register information provided to the memory device.

14. The method of claim 11, wherein N>8.

15. A processing system, comprising:
a processor;
a main memory unit;
a cache memory unit; and
a memory bus connecting the cache memory unit and the main memory unit,
wherein the cache memory unit comprises:
a cache memory;
a history table for storing therein a history of write operations to the cache memory unit;
an early write-back condition checking unit for checking whether an early write-back condition has been satisfied, wherein the early write-back condition checking unit determines that the early write-back condition has been satisfied in response to information received from the history table indicating that write addresses received by the cache memory unit have sequentially increased N times consecutively, where N>2, and wherein the early write-back condition checking unit determines that the early write-back condition has not been satisfied in response to information received from the history table indicating that the write addresses received by the cache memory unit have not sequentially increased N times consecutively; and
an early write-back execution unit for monitoring the memory bus, and in response to the memory bus being idle and the early write-back condition being satisfied, for causing dirty data in the cache memory to be written back to the main memory unit using the memory bus,
wherein the early write-back condition checking unit further determines whether the early write-back condition has been satisfied in response to special function register information provided to the cache memory unit, and wherein the special function register information indicates a number of blocks of data to be written back to the main memory unit.

16. The processing system of claim 15, wherein the special function register information further indicates a policy to be used to select which dirty data in the cache memory to write back to the main memory unit.

17. The processing system of claim 15, further comprising a write buffer, wherein the write buffer writes the dirty data in the cache memory to write back to the main memory.

18. The processing system of claim 15, wherein N>8.

19. The processing system of claim 15, wherein N>16.

20. A method of operating a processing system comprising a processor, a main memory unit, a memory device, and a memory bus connecting the memory device and the main memory unit, the method comprising:
(a) providing a plurality of write operations from the processor to the memory device, each of the write operations including data and a write address;
(b) storing in a history table a history of the write operations to the memory device;
(c) determining that an early write-back condition is satisfied in response to the stored history of write operations to the memory device indicating that write addresses received by the memory device have sequentially increased N times consecutively, where N>2, and wherein the early write-back condition is determined not satisfied in response to the stored history of write operations to the memory device indicating that the write addresses received by the memory device have not sequentially increased N times consecutively;

(d) determining whether a data block in the memory device corresponding to one of the write addresses is dirty;

(e) determining whether the memory bus is idle;

(f) when the early write-back condition is satisfied, and the data block is dirty, then writing the dirty data block back from the memory device to the external memory unit when the memory bus is idle; and (g) providing special function register information from the processor to the memory device, wherein determining whether an early write-back condition is satisfied further comprises reading the special function register information, and wherein the special function register information indicates a number of blocks of data to be written back to the main memory unit.

21. The method of claim 20, wherein determining whether an early write-back condition is satisfied comprises determining whether an early-write back mode is enabled in the memory device.

22. The method of claim 20, further comprising repeating steps (d)-(f) for M dirty data blocks, where M is included in the special function register information.

23. The method of claim 20, wherein N>8.

* * * * *